(12) United States Patent
Bailey et al.

(10) Patent No.: US 11,861,803 B2
(45) Date of Patent: *Jan. 2, 2024

(54) SESSION MANAGER

(71) Applicant: Magic Leap, Inc., Plantation, FL (US)

(72) Inventors: Richard St. Clair Bailey, Plantation, FL (US); Siddartha Pothapragada, Plantation, FL (US); Koichi Mori, Plantation, FL (US); Karen Stolzenberg, Fort Lauderdale, FL (US); Savannah Niles, Fort Lauderdale, FL (US); Domingo Noriega-Padilla, Miami, FL (US); Cole Parker Heiner, Fort Lauderdale, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/944,079

(22) Filed: Sep. 13, 2022

(65) Prior Publication Data

US 2023/0017752 A1    Jan. 19, 2023

Related U.S. Application Data

(63) Continuation of application No. 17/175,547, filed on Feb. 12, 2021, now Pat. No. 11,475,644.

(Continued)

(51) Int. Cl.
*G06F 3/01* (2006.01)
*H04L 67/131* (2022.01)
(Continued)

(52) U.S. Cl.
CPC .......... *G06T 19/006* (2013.01); *G06F 3/011* (2013.01); *H04L 67/131* (2022.05);
(Continued)

(58) Field of Classification Search
CPC .......... G06F 3/011; G06F 3/012; G06F 3/017; G06F 3/0346; H04L 67/131;
(Continued)

(56) References Cited

U.S. PATENT DOCUMENTS 4,852,988 A    8/1989    Velez
6,433,760 B1    8/2002    Vaissie
(Continued)

FOREIGN PATENT DOCUMENTS

CA    2316473 A1    1/2001
CA    2362895 A1    12/2002
(Continued)

OTHER PUBLICATIONS

Extended European Search Report dated Jul. 26, 2021, for EP Application No. 19841636.4, filed Jul. 22, 2019, nine pages.
(Continued)

*Primary Examiner* — Jeffery A Brier
(74) *Attorney, Agent, or Firm* — Morrison & Foerster LLP

(57) ABSTRACT

Disclosed are systems and methods for mixed reality collaboration. A method may include receiving persistent coordinate data; presenting a first virtual session handle to a first user at a first position via a transmissive display of a wearable device, wherein the first position is based on the persistent coordinate data; presenting a virtual object to the first user at a second location via the transmissive display, wherein the second position is based on the first position; receiving location data from a second user, wherein the location data relates a position of the second user to a position of a second virtual session handle; presenting a virtual avatar to the first user at a third position via the transmissive display, wherein the virtual avatar corresponds to the second user, wherein the third position is based on the
(Continued)

location data, and wherein the third position is further based on the first position.

20 Claims, 12 Drawing Sheets

Related U.S. Application Data

(60) Provisional application No. 62/977,079, filed on Feb. 14, 2020.

(51) Int. Cl.
*G02B 27/01* (2006.01)
*G06T 19/00* (2011.01)

(52) U.S. Cl.
CPC .... *G02B 27/0172* (2013.01); *G02B 2027/014* (2013.01); *G06T 2219/024* (2013.01)

(58) Field of Classification Search
CPC .......... G02B 27/0172; G02B 2027/014; G02B 2027/0141; G06T 19/006; G06T 2219/024; G06T 2219/2004; H04W 4/023
See application file for complete search history.

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,720,505 B2 | 8/2017 | Gribetz et al. |
| 9,811,237 B2 | 11/2017 | Schileru |
| 10,013,053 B2 | 7/2018 | Cederlund et al. |
| 10,025,379 B2 | 7/2018 | Drake et al. |
| 10,528,349 B2 | 1/2020 | Kumar |
| 10,977,868 B2 | 4/2021 | Neeter |
| 11,201,953 B2 | 12/2021 | Babu J D et al. |
| 11,335,070 B2 | 5/2022 | Baier et al. |
| 11,475,644 B2 | 10/2022 | Bailey et al. |
| 11,494,528 B2 | 11/2022 | Bailey et al. |
| 11,763,559 B2 | 9/2023 | Wang et al. |
| 2003/0030597 A1 | 2/2003 | Geist |
| 2005/0182844 A1 | 8/2005 | Johnson |
| 2006/0023158 A1 | 2/2006 | Howell et al. |
| 2009/0282369 A1 | 11/2009 | Jones |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0075343 A1 | 3/2012 | Chen et al. |
| 2012/0249416 A1 | 10/2012 | Maciocci et al. |
| 2013/0073707 A1 | 3/2013 | Butler et al. |
| 2013/0293468 A1 | 11/2013 | Perez et al. |
| 2013/0324245 A1 | 12/2013 | Harvey et al. |
| 2014/0123184 A1 | 5/2014 | Reisman |
| 2014/0168218 A1 | 6/2014 | Mitrea et al. |
| 2014/0195918 A1 | 7/2014 | Friedlander |
| 2014/0267234 A1 | 9/2014 | Hook et al. |
| 2015/0168731 A1 | 6/2015 | Robbins |
| 2015/0248779 A1 | 9/2015 | Lindquist |
| 2016/0104452 A1 | 4/2016 | Guan et al. |
| 2016/0343164 A1 | 11/2016 | Urbach |
| 2017/0236320 A1 | 8/2017 | Gribetz |
| 2018/0181198 A1 | 6/2018 | Trotta |
| 2018/0197340 A1 | 7/2018 | Loberg et al. |
| 2018/0197341 A1 | 7/2018 | Loberg et al. |
| 2018/0321894 A1 | 11/2018 | Paulovich et al. |
| 2019/0019348 A1 | 1/2019 | Yamamoto et al. |
| 2019/0114802 A1 | 4/2019 | Lazarow |
| 2019/0244426 A1 | 8/2019 | Knoppert et al. |
| 2019/0272674 A1 | 9/2019 | Comer et al. |
| 2019/0392640 A1 | 12/2019 | Qian et al. |
| 2020/0005538 A1 | 1/2020 | Neeter |
| 2020/0051328 A1 | 2/2020 | Mohan et al. |
| 2020/0051337 A1 | 2/2020 | Reynolds et al. |
| 2020/0160601 A1 | 5/2020 | Shreve et al. |
| 2020/0225904 A1 | 7/2020 | Cooper et al. |
| 2021/0256175 A1 | 8/2021 | Bailey et al. |
| 2021/0256261 A1 | 8/2021 | Wang et al. |
| 2021/0256769 A1 | 8/2021 | Bailey et al. |
| 2022/0070278 A1 | 3/2022 | Babu J D et al. |
| 2022/0245905 A1 | 8/2022 | Baier et al. |
| 2022/0383634 A1 | 12/2022 | Wang et al. |
| 2023/0014150 A1 | 1/2023 | Bailey et al. |

FOREIGN PATENT DOCUMENTS

| | | |
|---|---|---|
| CA | 2388766 A1 | 12/2003 |
| CN | 110352085 A | 10/2019 |
| WO | 2018106735 A1 | 6/2018 |
| WO | 2018165039 A1 | 9/2018 |
| WO | 2018175335 A1 | 9/2018 |
| WO | 2018224847 A2 | 12/2018 |
| WO | 2019074771 A1 | 4/2019 |
| WO | 2019199569 A1 | 10/2019 |
| WO | 2021163224 A1 | 8/2021 |
| WO | 2021163373 A1 | 8/2021 |
| WO | 2021163624 A1 | 8/2021 |
| WO | 2021163626 A1 | 8/2021 |

OTHER PUBLICATIONS

Final Office Action dated Apr. 8, 2022, for U.S. Appl. No. 17/175,547, filed Feb. 12, 2021, fourteen pages.
Final Office Action dated Dec. 10, 2021, for U.S. Appl. No. 17/174,141, filed Feb. 11, 2021, 14 pages.
Final Office Action dated Oct. 27, 2020, for U.S. Appl. No. 16/518,891, filed Jul. 22, 2019, fifteen pages.
International Preliminary Report on Patentability and Written Opinion dated Jan. 26, 2021, for PCT Application No. PCT/US2019/042881, filed Jul. 22, 2019, 16 pages.
International Preliminary Report on Patentability and Written Opinion dated Aug. 25, 2022, for PCT Application No. PCT/US2021/017508, filed Feb. 10, 2021, nine pages.
International Preliminary Report on Patentability and Written Opinion dated Aug. 25, 2022, for PCT Application No. PCT/US2021/017718, filed Feb. 11, 2021, seven pages.
International Preliminary Report on Patentability and Written Opinion dated Aug. 25, 2022, for PCT Application No. PCT/US2021/018035, filed Feb. 12, 2021, 8 pages.
International Preliminary Report on Patentability and Written Opinion dated Aug. 25, 2022, for PCT Application No. PCT/US2021/018037, filed Feb. 12, 2021, nine pages.
International Search Report and Written Opinion dated Apr. 28, 2021, for PCT Application No. PCT/US2021/17508, filed Feb. 10, 2021, 16 pages.
International Search Report and Written Opinion dated Jun. 15, 2021, for PCT Application No. PCT/US2021/18037, filed Feb. 12, 2021, 17 pages.
International Search Report and Written Opinion dated May 3, 2021, for PCT Application No. PCT/US2021/18035, filed Feb. 12, 2021, 14 pages.
International Search Report dated Apr. 22, 2021, for PCT Application No. PCT/US2021/017718, filed Feb. 11, 2021, two pages.
International Search Report dated Oct. 2, 2019, for PCT Application No. PCT/US2019/042881, filed Jul. 22, 2019, three pages.
Non-Final Office Action dated Dec. 15, 2021, for U.S. Appl. No. 17/175,547, filed Feb. 12, 2021, thirteen pages.

(56) References Cited

OTHER PUBLICATIONS

Non-Final Office Action dated Feb. 17, 2022, for U.S. Appl. No. 17/175,467, filed Feb. 12, 2021, 23 pages.
Non-Final Office Action dated Mar. 16, 2022, for U.S. Appl. No. 17/174,141, filed Feb. 11, 2021, eighteen pages.
Non-Final Office Action dated May 14, 2020, for U.S. Appl. No. 16/518,891, filed Jul. 22, 2019, eighteen pages.
Non-Final Office Action dated Sep. 1, 2021, for U.S. Appl. No. 17/174,141, filed Feb. 11, 2021, thirteen pages.
Notice of Allowance dated Apr. 22, 2021, for U.S. Appl. No. 16/518,891, filed Jul. 22, 2019, nine pages.
Notice of Allowance dated Aug. 26, 2022, for U.S. Appl. No. 17/175,467, filed Feb. 12, 2021, eight pages.
Notice of Allowance dated Aug. 5, 2022, for U.S. Appl. No. 17/175,547, filed Feb. 12, 2021, nine pages.
Notice of Allowance dated Aug. 9, 2021, for U.S. Appl. No. 16/518,891, filed Jul. 22, 2019, eight pages.
Notice of Allowance dated Jan. 20, 2022, for U.S. Appl. No. 17/173,125, filed Feb. 10, 2021, twelve pages.
Notice of Allowance dated Jul. 11, 2022, for U.S. Appl. No. 17/174,141, filed Feb. 11, 2021, nine pages.
Notice of Allowance dated Nov. 23, 2021, for U.S. Appl. No. 17/173,125, filed Feb. 10, 2021, eleven pages.
Schmalstieg, D. et al. "Bridging Multiple User Interface Dimensions with Augmented Reality", Oct. 2000, In Proceedings IEEE and ACM International Symposium on Augmented Reality (ISAR 2000) pp. 20-29. (Year: 2000).
Shen, Y. et al., "Augmented Reality for Collaborative Product Design and Development", Elsevier, 2009 (Year: 2009).
Youtube. "Augmented Reality—annotating an object" https://www.youtube.com/watch?v=ESOZndNnGh0 (Year: 2019).
Youtube. "Real Object Annotations in Augmented Reality in Product Design", https://www.youtube.com/watch?v=cy8ow0reAfl (Year: 2013).
Jacob, R. "Eye Tracking in Advanced Interface Design", Virtual Environments and Advanced Interface Design, Oxford University Press, Inc. (Jun. 1995).
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Chinese Office Action dated Mar. 29, 2023, for CN Application No. 202180028410.5, with English translation, 12 pages.
Chinese Office Action dated May 13, 2023, for CN Application No. 202180028398.8, with English translation, 6 pages.
Non-Final Office Action dated Mar. 29, 2023, for U.S. Appl. No. 17/949,989, filed Sep. 21, 2022, ten pages.
European Communication dated Jan. 20, 2023, for EP Application No. 19841636.4, filed Jul. 22, 2019, six pages.
Non-Final Office Action dated Mar. 20, 2023, for U.S. Appl. No. 17/723,245, filed Apr. 18, 2022, sixteen pages.
Extended European Search Report dated Jul. 6, 2023, for EP Application No. 21754096.2, eight pages.
Extended European Search Report dated Jun. 12, 2023, for EP Application No. 21753609.3, nine pages.
Extended European Search Report dated Jun. 30, 2023, for EP Application No. 21753304.1, nine pages.
Extended European Search Report dated Jun. 9, 2023, for EP Application No. 21753843.8, nine pages.
Final Office Action dated Sep. 29, 2023, for U.S. Appl. No. 17/723,245, filed Apr. 18, 2022, nineteen pages.
Japanese Office Action dated Jul. 27, 2023, for JP Application No. 2021-503735, with English translation, 13 pages.
Non-Final Office Action dated Aug. 17, 2023, for U.S. Appl. No. 17/521,740, filed Nov. 8, 2021, fourteen pages.
Notice of Allowance dated Jul. 21, 2023, for U.S. Appl. No. 17/174,141, filed Feb. 11, 2021, seven pages.
Notice of Allowance dated Jul. 26, 2023, for U.S. Appl. No. 17/949,989, filed Sep. 21, 2022, five pages.
Schmalstieg, D. et al., (2002). "Distributed Applications for Collaborative Augmented Reality", Proceedings IEEE Virtual Reality 2002 [online], US, IEEE, Mar. 24, 2002, pp. 1-8, URL: https://ieeexplore.ieee.org/stamp/stamp.jsp?tp=&arnumber=996505 retrieved on Jul. 25, 2023.

SESSION MANAGER

CROSS-REFERENCE TO RELATED APPLICATIONS

This application is a continuation of U.S. application Ser. No. 17/175,547, filed on Feb. 12, 2021, which claims benefit of U.S. Provisional Application No. 62/977,079, filed Feb. 14, 2020, all of which are hereby incorporated by reference in their entirety.

FIELD

This disclosure relates in general to systems and methods for managing and enabling virtual collaboration, and in particular to systems and methods for managing and enabling virtual collaboration in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems may be uniquely positioned to enable greater collaboration between people. The ability to present virtual content in a persistent and three-dimensional manner can allow people to more naturally interact with virtual content. For example, arranging virtual objects in three-dimensional space may enable much more natural location recall than what two-dimensional screens can offer. Where a user of a two-dimensional screen may have to hunt through one of forty open tabs to re-open a desired application, a user of an XR system may be able to pinpoint a desired virtual object displayed on a desk (like picking up a real folder placed on a desk). Furthermore, XR systems may enable users to see virtual avatars of other users to simulate the live presence of other people. This may enable more natural collaboration than what a telephone call or even videoconference can offer. It can therefore be desirable to develop systems and methods for enabling deep user collaboration on XR systems.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that enable consistent placement of virtual objects across multiple XR systems.

BRIEF SUMMARY

Examples of the disclosure describe systems and methods for enabling mixed reality collaboration. According to examples of the disclosure, a method may include receiving persistent coordinate data; presenting a first virtual session handle to a first user at a first position via a transmissive display of a wearable device, wherein the first position is based on the persistent coordinate data; presenting a virtual object to the first user at a second location via the transmissive display, wherein the second position is based on the first position; receiving location data from a second user, wherein the location data relates a position of the second user to a position of a second virtual session handle; presenting a virtual avatar to the first user at a third position via the transmissive display, wherein the virtual avatar corresponds to the second user, wherein the third position is based on the location data, and wherein the third position is further based on the first position.

DETAILED DESCRIPTION

Figure 1A:
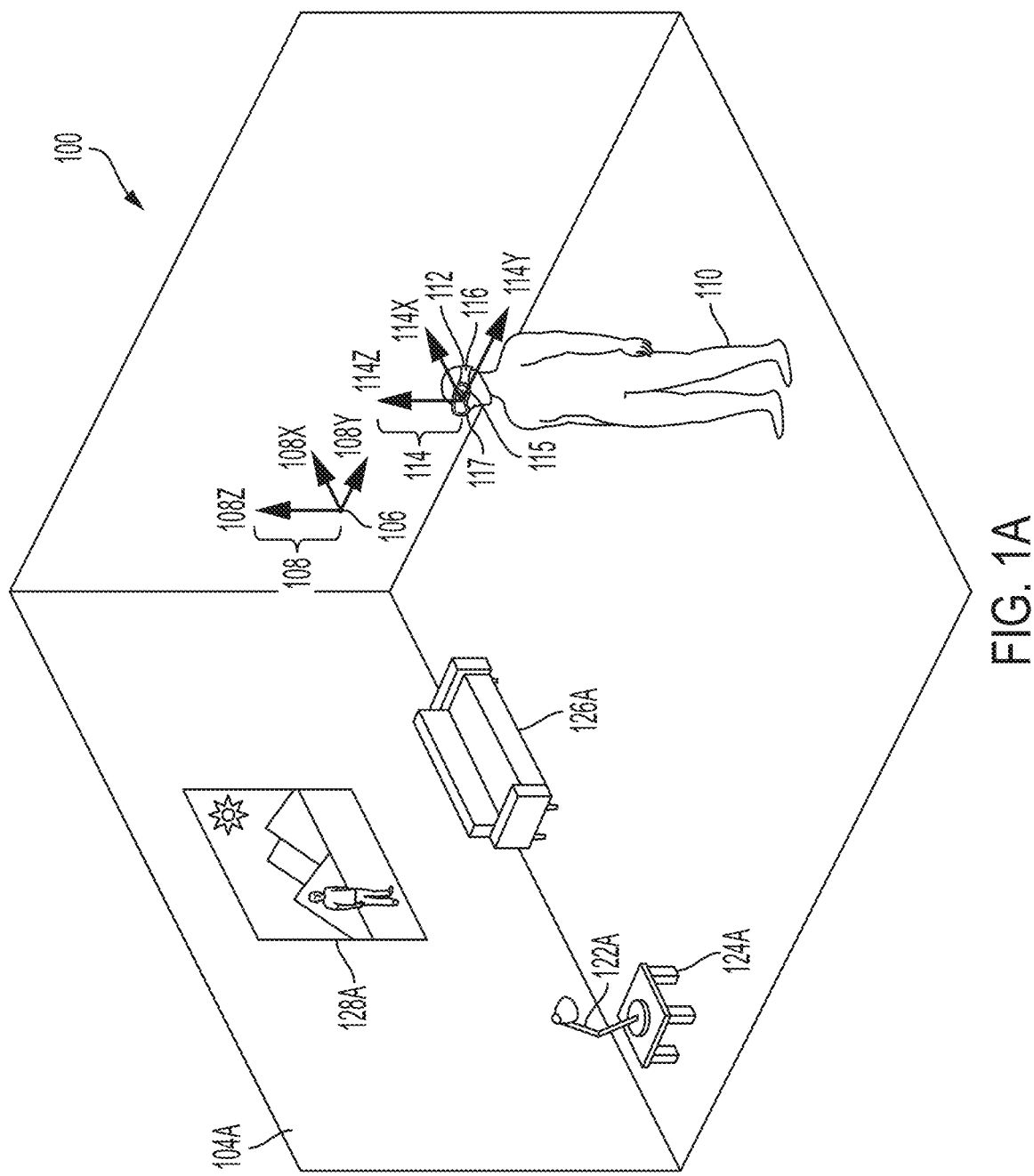
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
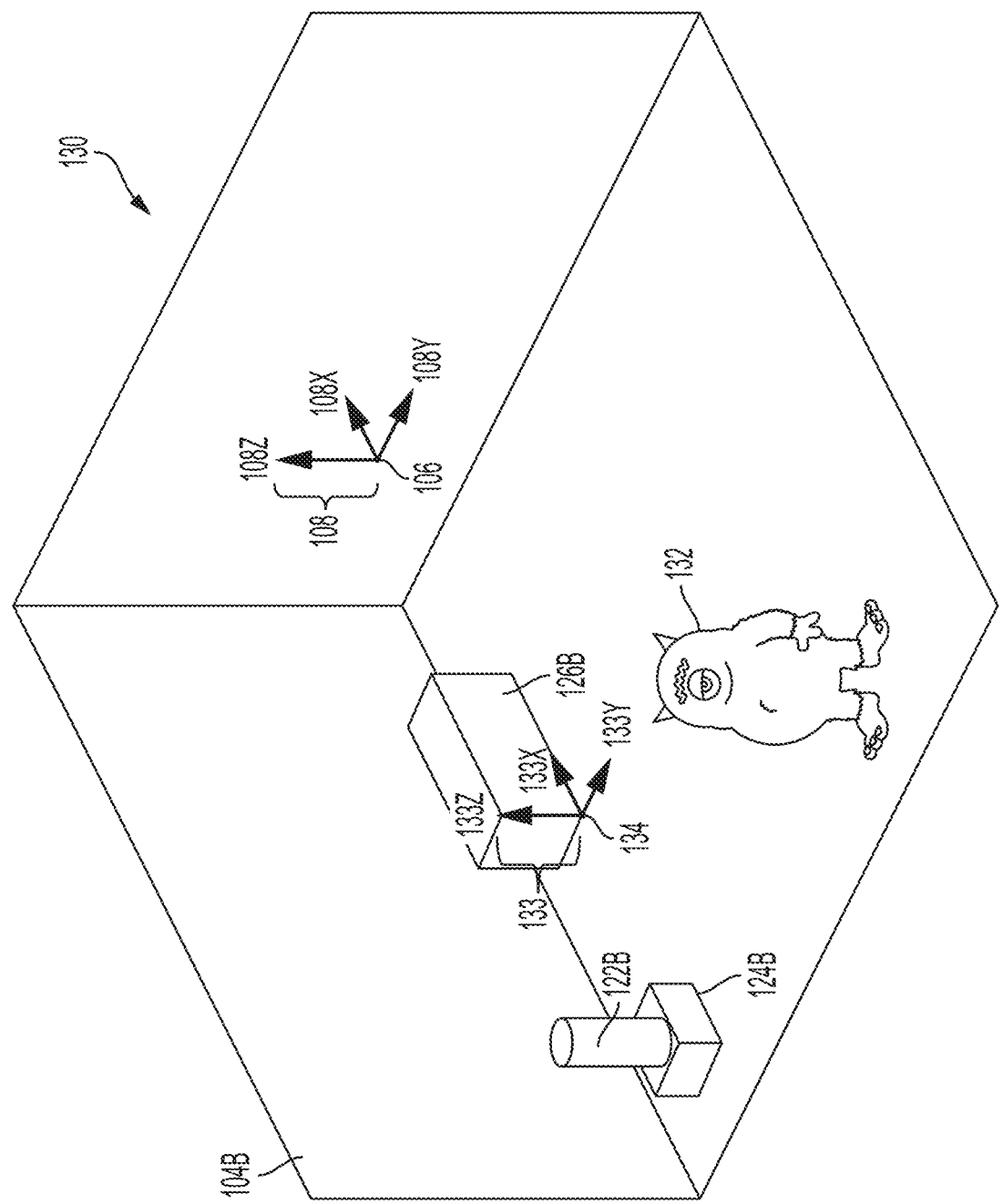

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. An MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by an MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, an MR system may use simultaneous localization and mapping to generate persistent coordinate data (e.g., the MR system may assign a persistent coordinate system to a point in space). In some embodiments, an MR system may map an environment by generating persistent coordinate data at regular intervals (e.g., an MR system may assign persistent coordinate systems in a grid where persistent coordinate systems may be at least within five feet of another persistent coordinate system).

In some embodiments, persistent coordinate data may be generated by an MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, an MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
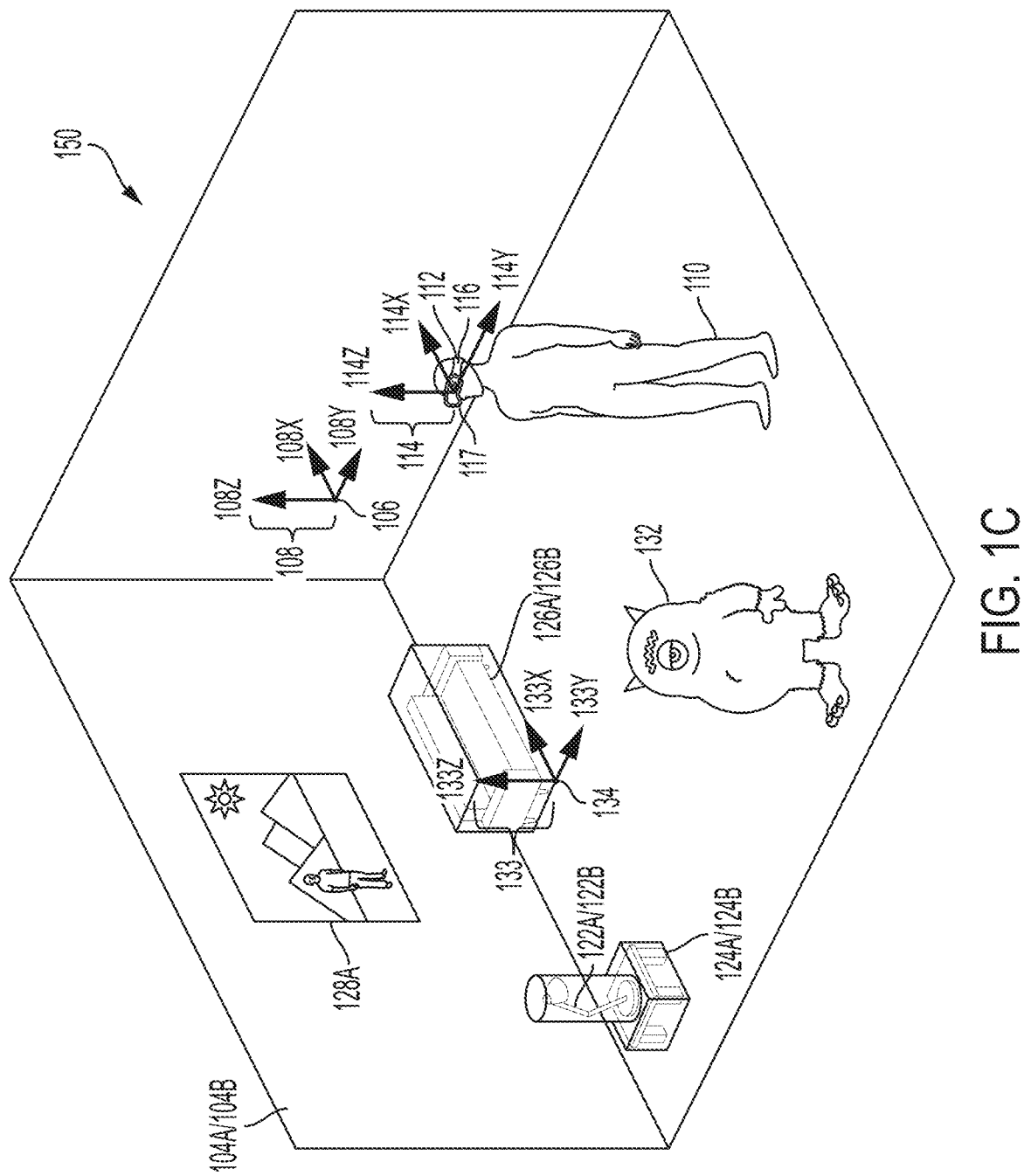

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
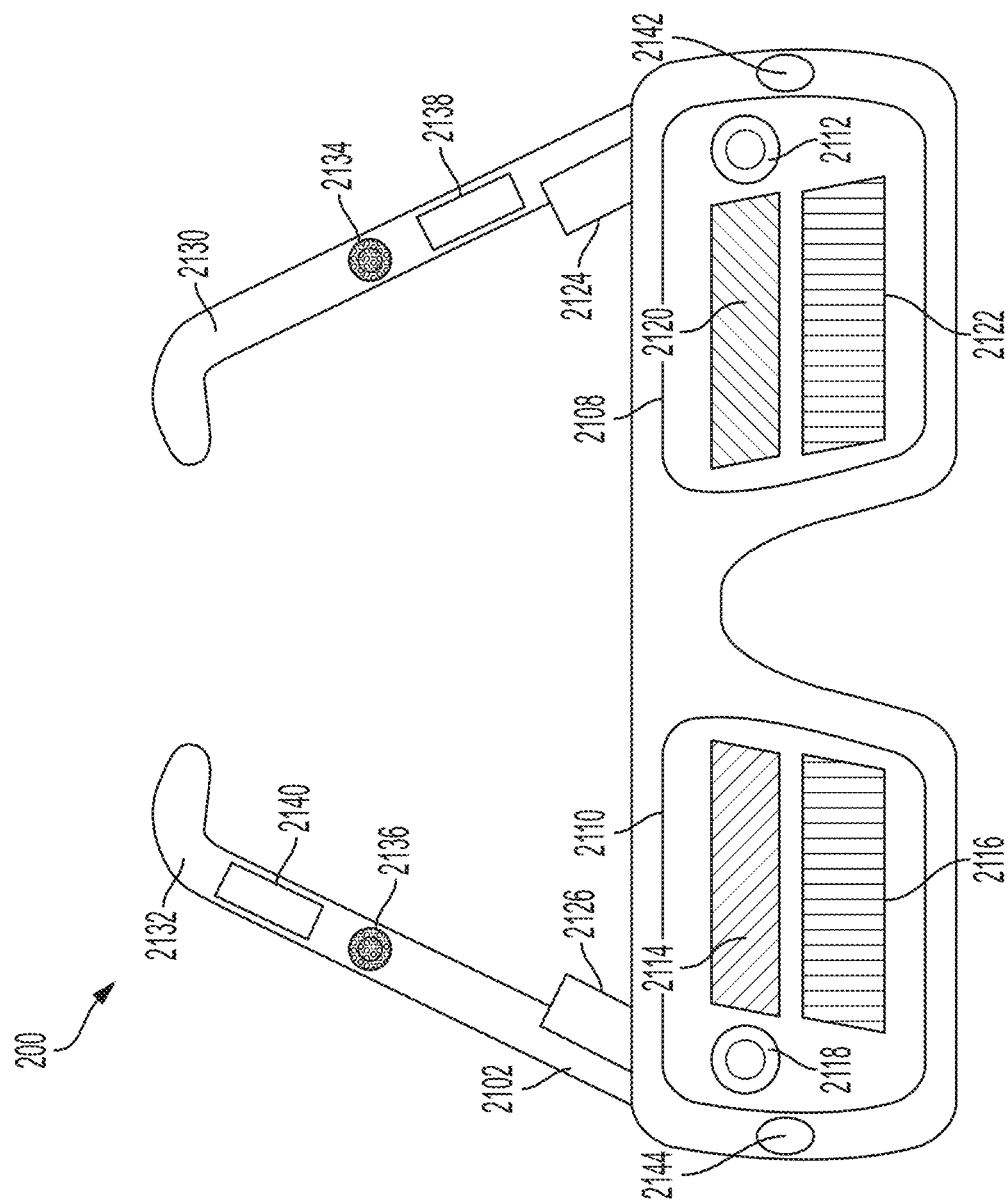
FIGS. 2A-2D illustrate components of an example mixed reality system that can be used to generate and interact with a mixed reality environment, according to some embodiments.
Figure 2B:
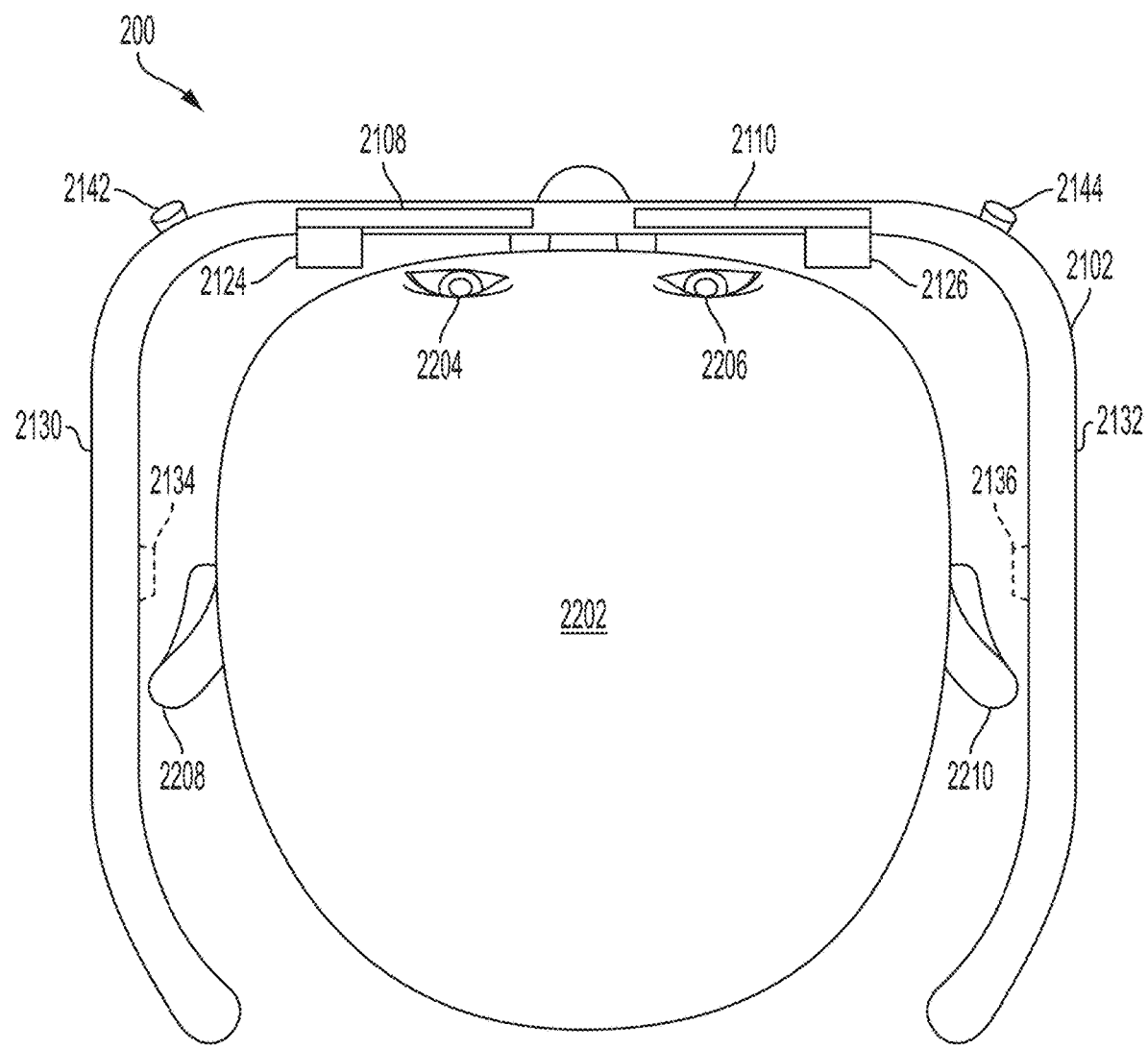
Figure 2C:
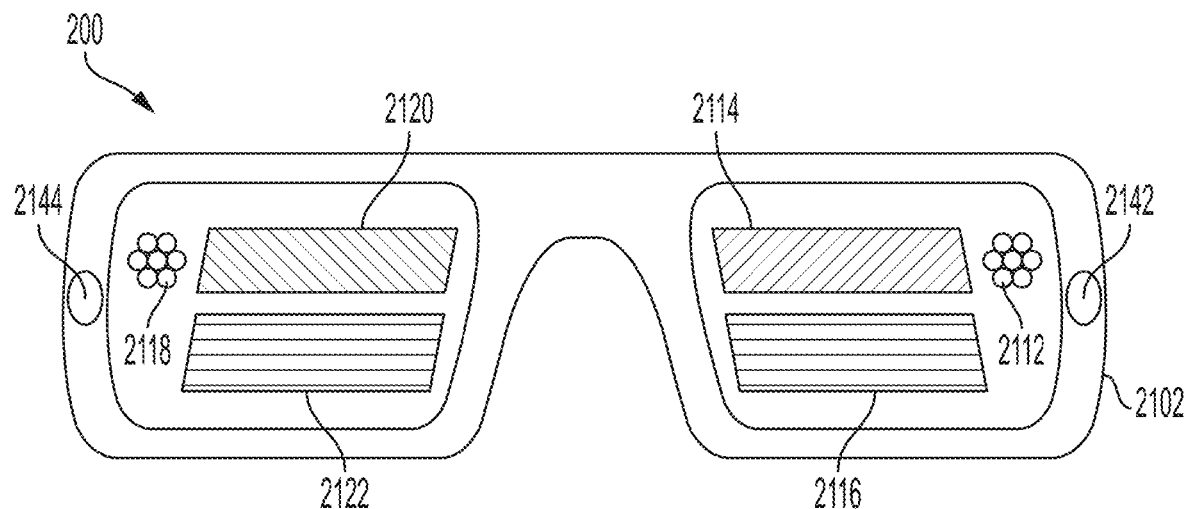
Figure 2D:
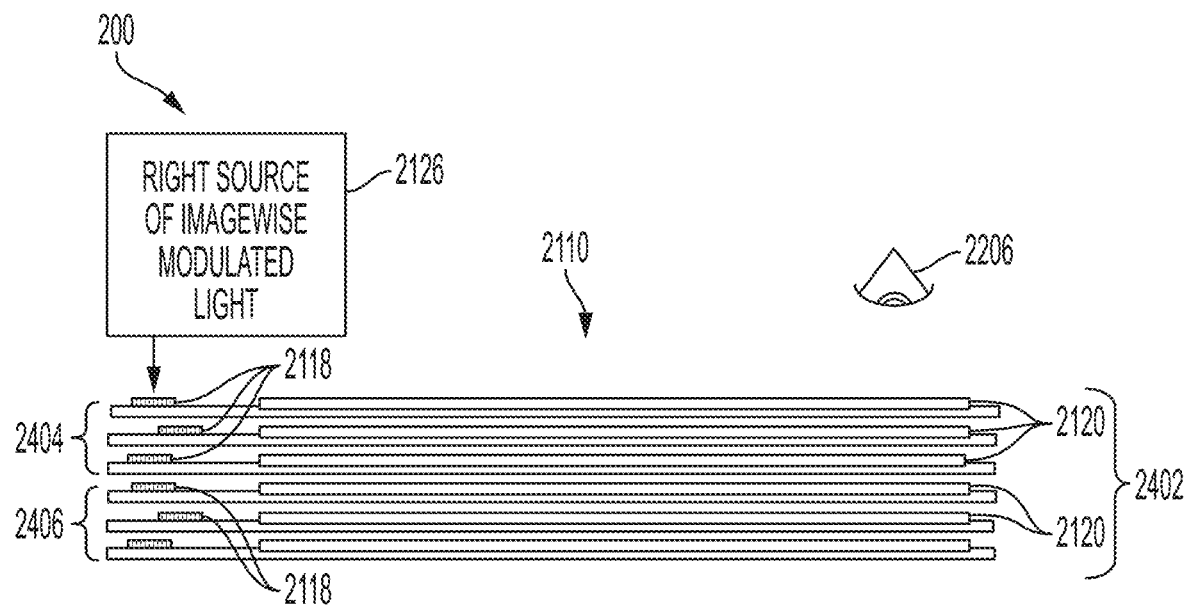

FIGS. 2A-2D illustrate components of an example mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
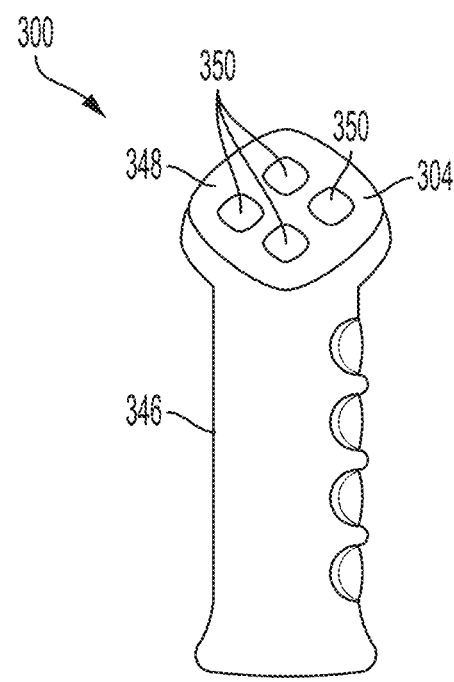
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
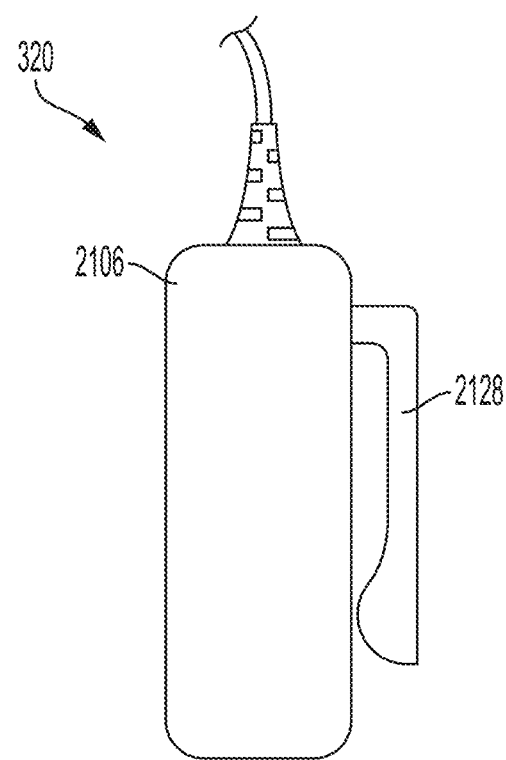
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
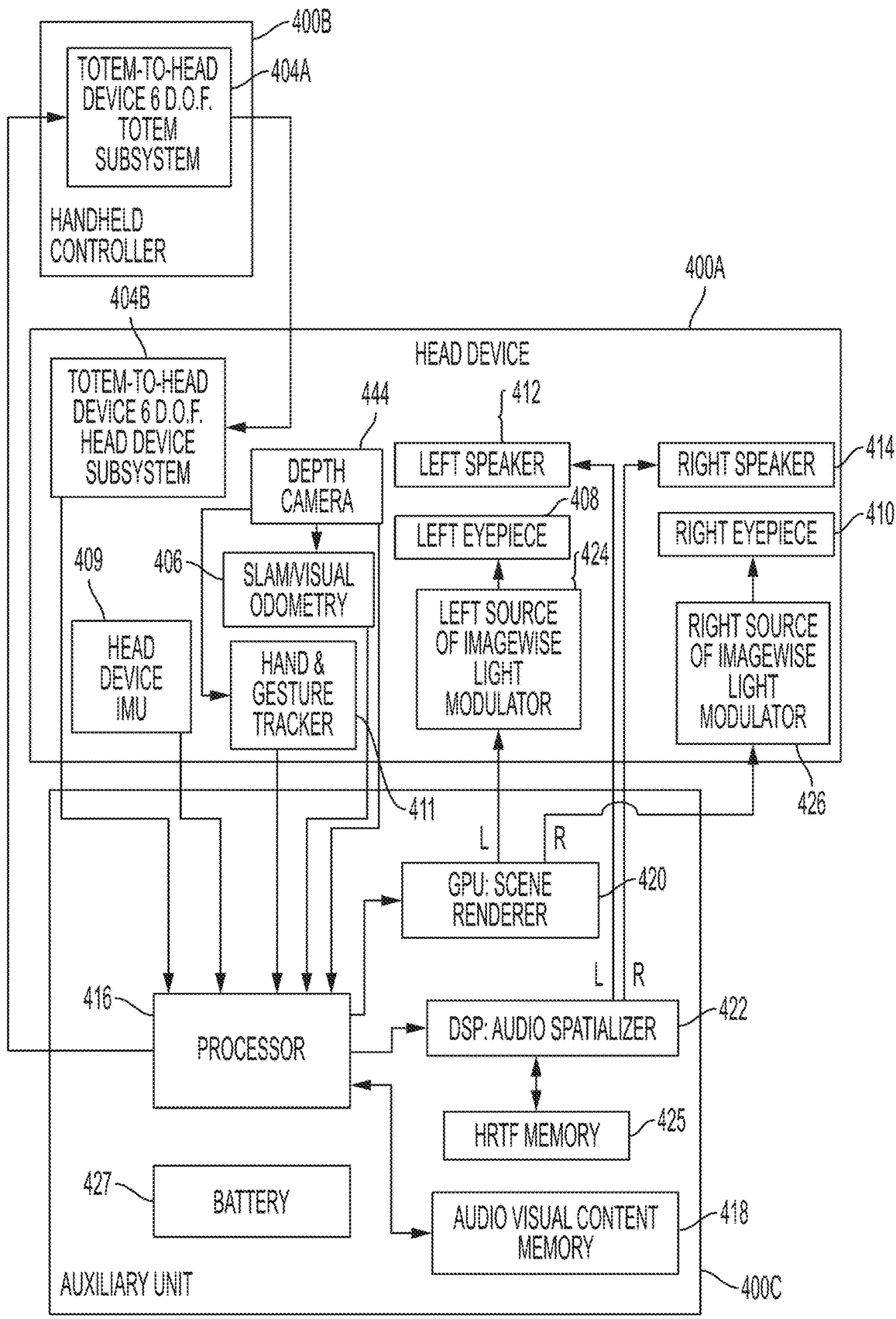
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Session Manager

MR systems may be uniquely positioned to enable interactive virtual collaboration between users. Because MR systems may present virtual content three-dimensionally and in a user's physical environment, MR collaboration systems and methods may enable remote collaboration that can be at least as effective as local collaboration. In some embodiments, MR collaboration can allow users to see and/or manipulate virtual content in three-dimensional space. For example, a first user may launch an MR collaboration session and may see two virtual 3D models, a text document, and a messaging interface. A second user may join the session locally (e.g., the second user may walk into the same room as the first user), and the second user may see the same two virtual 3D models, text document, and messaging interface in the same location as the first user. In some embodiments, a third user may join the session remotely (e.g., the third user may not be in the same room as the first and the second users), and the third user may see the two virtual 3D models, text document, and messaging interface in the third user's environment. In some embodiments, the virtual content may share spatial relationships with each other (e.g., the virtual content may be arranged the same way) for all session users. In some embodiments, MR collaboration may allow users in the same physical space to leverage the shared physical context to enjoy more meaningful shared experiences involving virtual content.

In some embodiments, displaying and/or synchronizing virtual content across multiple MR systems may pose challenges. For example, it can be beneficial to develop systems and methods for ensuring each MR system displays shared virtual content in a manner that is consistent with other MR systems in a session. It can also be beneficial to develop systems and methods that may enable cross-application collaboration (e.g., virtual content that may be generated using applications created by different developers). In some embodiments, it can be beneficial to develop systems and methods that may allow users that are local to each other (e.g., users that are in the same room) to collaborate with each other as well as with users that are remote (e.g., in a different room). In some embodiments, it can be beneficial to develop systems and methods that may enable collaboration sessions to persist over time such that session users may continue collaborating at a later time. In some embodiments, it can be beneficial to develop systems and methods that may enable content persistence such that a session user to continue working on virtual content even without collaborating live with other users.

In some embodiments, a session may be broadly defined as a group of users (with identifiers) that can collaborate and share a series of experiences over time and space. In some embodiments, a session can include a communication and collaboration experience that provides network connectivity, common spatial references and a centralized user interface for chatting and sharing prisms with other MR users. Session participants can be remote or local in the same physical location. In some embodiments, a session manager can include a centralized backend service that manages some or all activity within a session. In some embodiments, session manager can include one or more user-facing, front-end controls and/or expressions representing session manager and/or configured to receive user input (e.g., a menu and/or a session handle). In some embodiments, session manager can include a background service and/or daemon that orchestrates and manages various session events through various session states. Session manager may also drive the user experience by allowing users to be discovered and get connected with other users. In some embodiments, session manager may also manage various UI components such as a menu and/or session UI related states.

In some embodiments, collaboration can be facilitated by configuring virtual content in a collaboration session to behave similarly to real objects in collaboration sessions. For example, in a "real" collaboration session, users may sit around a table with documents and/or objects. Users may refer to "this" document and/or "that" document by pointing at a particular document. In some embodiments, users in a real collaboration session may refer to objects using relational terms (e.g., that object to the right). This behavior may occur naturally to users as a result of years of conditioning and working physically with other people. It can therefore be desirable to develop systems and methods for MR collaboration to enable natural interactions between users and the content on which they are collaborating on. In some embodiments, MR collaboration sessions can enable users to refer to colocated virtual content (e.g., virtual content that may appear in the same position in a real environment to multiple users) as if it were real content present in the user's physical environment. In some embodiments, MR collaboration sessions can persist. For example, all users may exit a session, and a user may launch the same session several weeks later. In some embodiments, the user may see all virtual content in the state at which it existed (e.g., in the same relative positions and/or with the same edits) when the users previously exited the session.

In some embodiments, a session can include a platform for presenting, synchronizing, managing, and/or storing virtual content used in a mixed reality collaboration session. For example, session users may have a recurring weekly meeting in which virtual content (e.g., word documents, 3D models, presentation slides, conversation history, etc.) are discussed and/or worked on. In some embodiments, users may leverage the platform of sessions to consolidate virtual content (which may be created by different developers) into a single virtual space that may persist over time. For example, loading a single session instance may present to a user a 3D model (generated using a first application created by a first developer), a text document describing goals and/or changes to the 3D model (generated using a second application created by a second developer), and a conversation history between session users related to this session.

This virtual content may persist across time and across session users, such that the same user or a different session user may load the session and see the same session contents as any other session user. In some embodiments, a session may enable user presence flexibility (e.g., local users may share virtual content placement in their local space, but remote users may also see virtual content with the same spatial relationships in their remote space). In some embodiments, a session may enable capability flexibility. For example, capabilities (e.g., corresponding to third-party applications) can be interacted with/enabled/disabled without leaving a centralized session platform. In some embodiments, applications (e.g., third-party applications) may leverage the session platform to forgo building proprietary sharing platforms that may not be compatible with other apps. In some embodiments, a session may enable temporal flexibility. For example, users may access sessions at different times, and a live call with other users may not be necessary. In some embodiments, changes made by users can be synchronized such that the change may be reflected for other session users (whether they are currently in the session or enter the session at a later time).

In some embodiments, a session may include virtual content shared with one or more users over time. A session may have one or more owners, and in some embodiments, a user who created the session may be considered a session owner. A session may have one or more participants who may have access to the session. In some embodiments, a session owner may control what participants may join the session. In some embodiments, a session may have a session identifier. In some embodiments, each user (e.g., owner or participant) may have a user identifier. In some embodiments, a session may include one or more user avatars, which may represent a remote user's positioning relative to other objects in a session. In some embodiments, a session may include location data (e.g., location data corresponding to each user, location data corresponding to locations the session has been opened in, etc.). Location data may include persistent coordinate data. In some embodiments, location data may include one or more transforms (e.g., one or more transformation matrices), which may relate a position to persistent coordinate data.

In some embodiments, a session can include one or more capabilities. A session capability may include one or more features that users can select and/or enable in a session. For example, virtual object sharing may be considered a session capability. In some embodiments, determining whether users are local to other users may be considered a session capability. In some embodiments, projecting a user avatar may be considered a session capability. In some embodiments, casting a user's screen to other users may be considered a session capability. In some embodiments, a capability can have one or more capability instances (e.g., a capability can have multiple instances running at the same time). For example, two virtual objects may be shared with users in a session, and each virtual object may be considered a separate capability instance.

In some embodiments, a session may be persistent. For example, a session may continue to exist even after all users have exited a session. In some embodiments, a session may continue to store session information such as session capabilities used (e.g., sharing a virtual object, what position the virtual object was in, etc.), user locations, user identifications, etc. Persistent sessions may facilitate long-term collaboration between users. For example, users may continue where they left off without having to rearrange their virtual workspace to their preference. In some embodiments, session persistence may enable a different user to enter the session at a later time and see virtual content arranged as it was when a previous user exited the session.

Figure 5A:
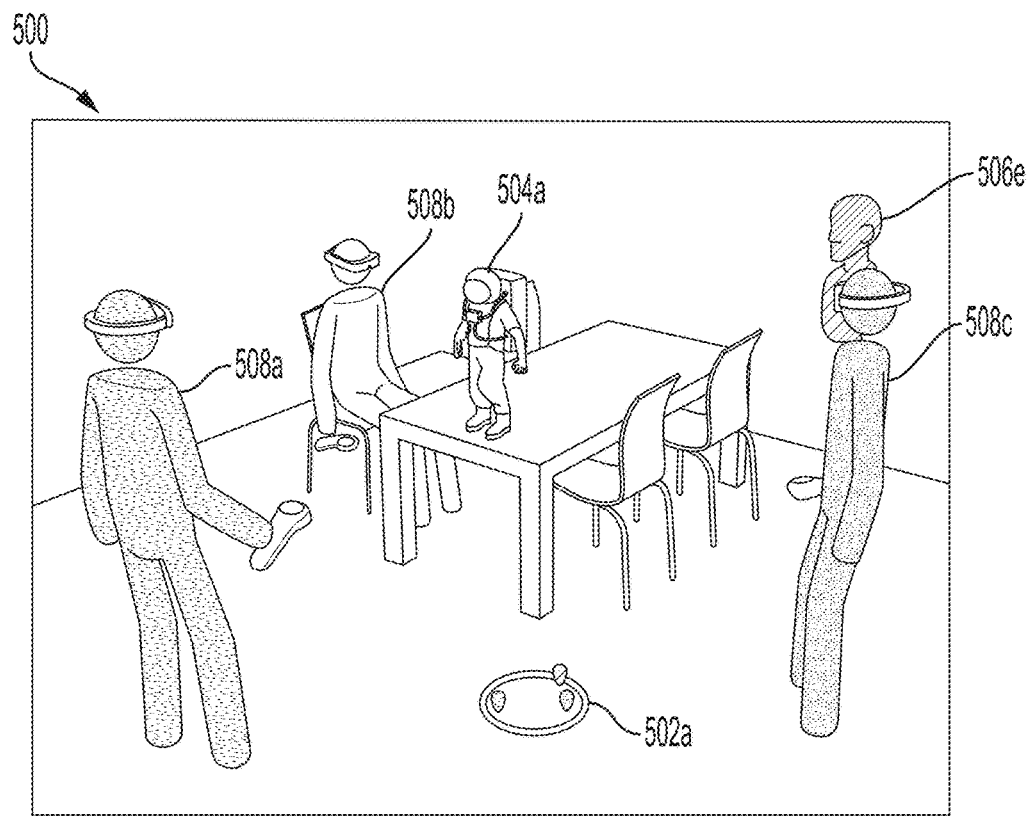
FIGS. 5A-5C illustrate an example of a mixed reality collaboration session, according to some embodiments.
Figure 5B:
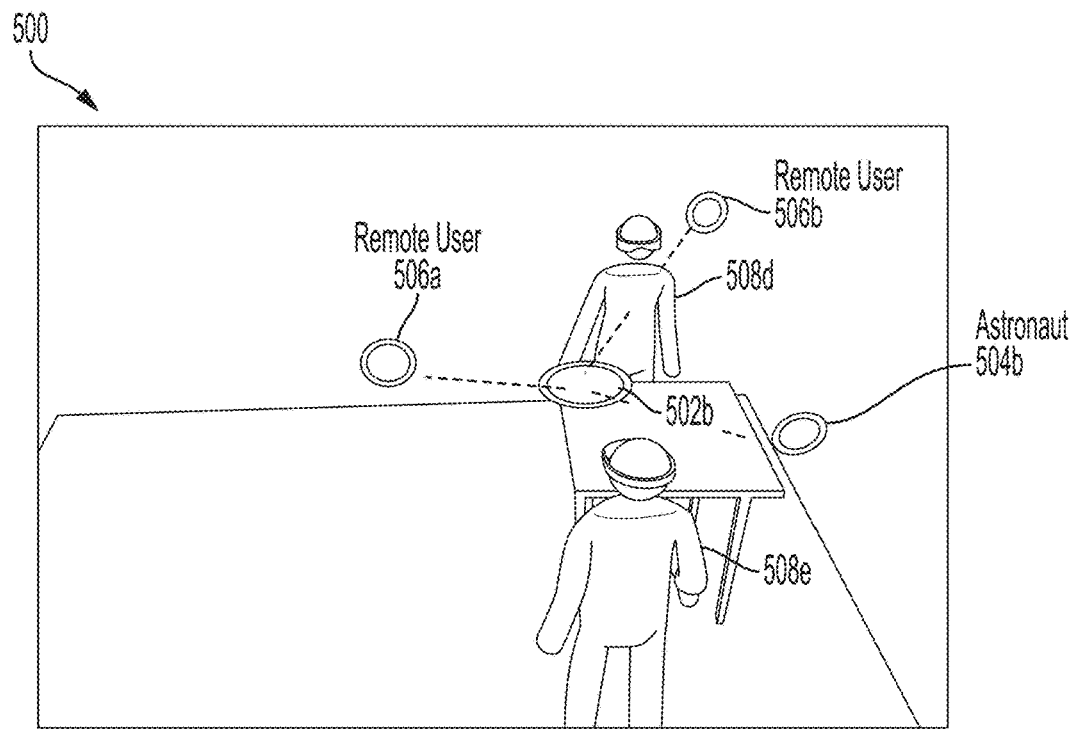
Figure 5C:
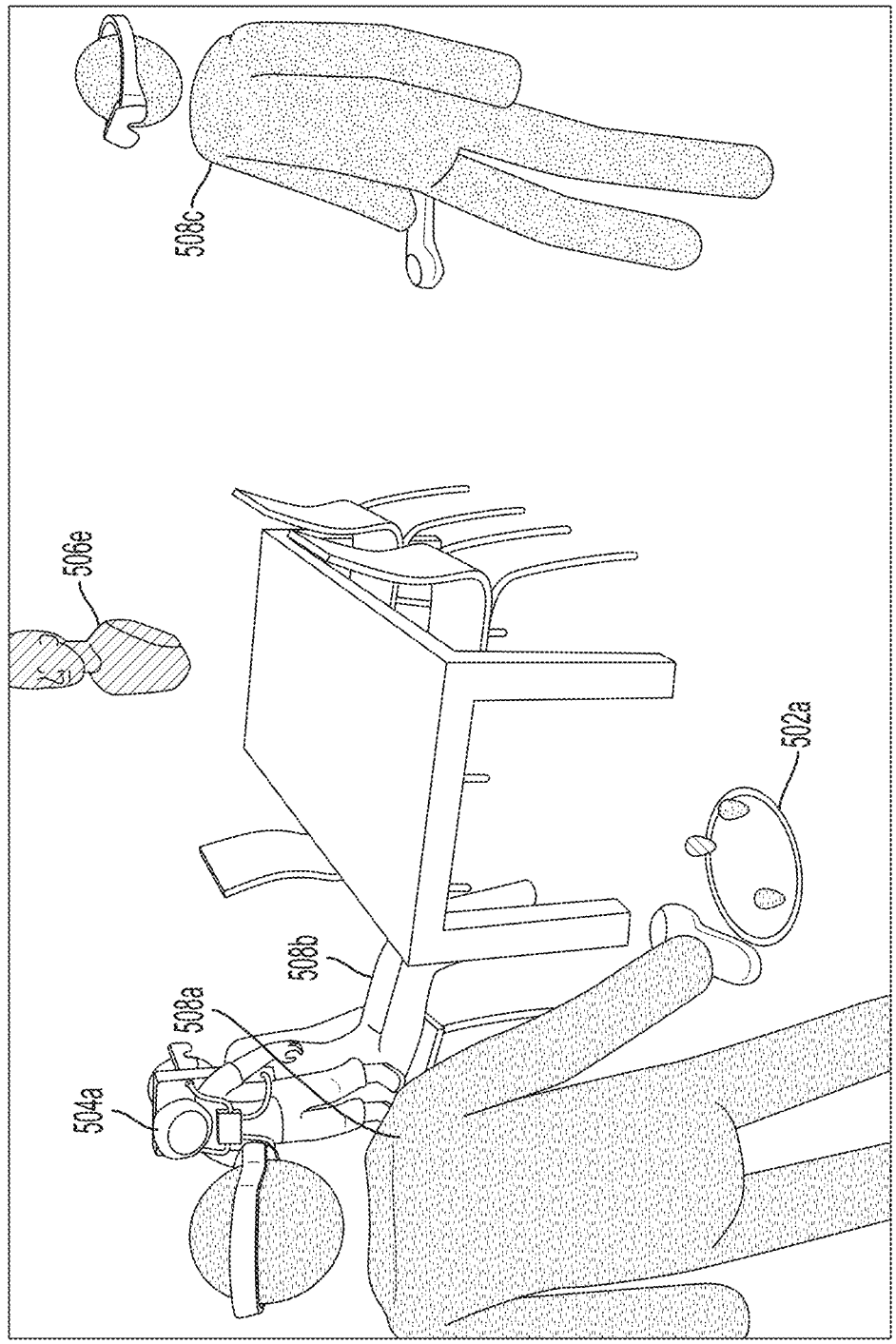

FIGS. 5A-5C illustrate an exemplary MR collaboration session, according to some embodiments. FIG. 5A illustrates an exemplary mixed reality collaboration session where users 508a, 508b, and 508c may be at a first location (e.g., a first room) together. FIG. 5B illustrates an exemplary mixed reality collaboration session where users 508d and 508e may be at a second location (e.g., a second room) together. FIG. 5C illustrates an exemplary mixed reality collaboration session where a session handle has been moved.

In some embodiments, users 508a, 508b, 508c, 508d, and 508e may all be part of the same mixed reality collaboration session 500. In some embodiments, a collaboration session can include a session handle 502a (which may be a virtual object). Session handle 502a may serve as a local anchor for a session. For example, all session users in the same location (e.g., users 508a, 508b, and 508c may be considered in the same location if they share common persistent coordinate data) may be presented virtual content positioned relative to session handle 502a, which may give the virtual content the appearance of being located in a particular location and orientation in the real world, similar to a real/physical object. In some embodiments, session handle 502a may be positioned relative to persistent coordinate data (e.g., using a transform). In some embodiments, users 508a, 508b, and 508c may be using canonical persistent coordinate data, which may enable consistent placement of session handle 502a in each user's MR system. In some embodiments, users 508a, 508b, and 508c may all see session handle 502a at the same location (e.g., the users may all see session handle 502a on the floor at the same location).

In some embodiments, whether users can be considered local to each other may be determined using persistent coordinate data. For example, an MR system for user 508a may receive (e.g., from one or more remote servers) canonical persistent coordinate data based on an identified environment for user 508a. An MR system for user 508a may use location data (e.g., GPS, WiFi, and/or cellular data) and/or image recognition data (e.g., recognizing a known environment by comparing captured images with images of known environments) to identify an environment for user 508a. In some embodiments, an MR system for user 508a may transmit its received persistent coordinate data to other MR systems in a session (e.g., an MR system for user 508b). In some embodiments, other MR systems in a session may receive canonical persistent coordinate data and compare the transmitted data received from other MR systems with canonical persistent coordinate already in use (and/or canonical persistent coordinate data received from one or more remote servers). If it is determined (e.g., using unique identifiers) that one or more instances of canonical persistent coordinate data is shared between MR systems in a session, it can be determined that the MR systems are local to each other. In some embodiments, if MR systems do not share instances of canonical persistent coordinate data, it may be determined that the MR systems are remote from each other. In some embodiments, a session handle (e.g., session handle 502a) may be displayed in relation to one or more shared instances of persistent canonical persistent coordinate data, which may enable session handle 502a to be presented in the same location to users 508a, 508b, and 508c.

In some embodiments, session 500 can include a shared virtual object 504a. Shared virtual object 504a may be considered a session capability instance. In some embodiments, users 508a, 508b, and 508c may all see virtual object 504a in the same location (e.g., the users may all see virtual object 504a at the end of a real table). In some embodiments, shared virtual object 504a may be positioned relative to session handle 502a (e.g., using a transform). In some embodiments, shared virtual object 504a may be positioned relative to persistent coordinate data (e.g., canonical persistent coordinate data). In some embodiments, a user (e.g., user 508c) may manipulate shared virtual object 504a. For example, user 508c may move object 504a from the edge of the table to the center of the table. In some embodiments, users 508a and 508b may also see object 504a move from the edge of the table to the center of the table. In some embodiments, if a user (e.g., user 508b) points to a portion of object 504a (e.g., the helmet), other users (e.g., 508a and 508c) may also see user 508b as pointing at the same portion of object 504a.

In some embodiments, session handle 502a may also be moved. For example, in FIG. 5C, user 508a may move session handle 502a to the left. In some embodiments, any virtual content displayed as part of a session may also move, thereby maintaining the same relative positioning to session handle 502a. For example, as session handle 502a is moved to the left, object 504a may also be moved to the left by the same amount. In some embodiments, moving a session handle at one location (e.g., session handle 502a) may not move a session handle at a different location (e.g., session handle 502b). It can be beneficial to allow each group of local users to manage their own session handle placement. For example, because virtual content may be positioned relative to a session handle, each local group may determine an optimal location for their virtual content for their respective local physical environments.

Session 500 can involve users that may not share the same location. For example, in FIG. 5B, users 508d and 508e may also be part of session 500. In some embodiments, users 508d and 508e may be considered remote to users 508a, 508b, and 508c (e.g., because there may not be common persistent coordinate data between users 508d/508e and 508a/508b/508c). In some embodiments, users 508d and 508e may see a second session handle 502b. In some embodiments, each user (or group of users) that does not have common persistent coordinate data with other users (or groups of users) may see their own session handle. Shared virtual content displayed to users 508d and 508e may be displayed relative to session handle 502b. For example, shared virtual object 504b may correspond to object 504a. In some embodiments, object 504b may be positioned in the same spot relative to session handle 502b as object 504a is positioned relative to session handle 502a. In some embodiments, if object 504a is moved relative to session handle 502a, object 504b may also move relative to session handle 502b (and vice versa). In some embodiments, session handle 502b may not move if session handle 502a is moved. This may enable local users to manage how session contents are presented to the local group of users.

In some embodiments, session 500 can include a user avatar 506e. In some embodiments, user avatar 506e can represent a user in session 500 that may be remote to other users in the session. For example, users 508a, 508b, and 508c may be considered local to each other (e.g., because they may share persistent coordinate data), and user 508e may be considered remote from users 508a, 508b, and 508c (e.g., because user 508e may not share persistent coordinate data with the other users). In some embodiments, user 508e (in FIG. 5B) may also be part of session 500, and user avatar 506e may correspond to user 508e.

In some embodiments, user avatar 506e may enable user 508e to collaborate with users 508a, 508b, and 508c. In some embodiments, avatar 506e may mirror one or more movement of user 508e. For example, as user 508e approaches session handle 502b, user avatar 506e may approach session handle 502a, thereby maintaining the same relative positioning between user 508e and session handle 502b. In some embodiments, user 508e may point to object 504b, and avatar 506e may correspondingly point to object 504a at the same location. Similarly, avatar 506b may represent user 508b, and avatar 506a may represent user 508a. As user 508a approaches object 504a, avatar 506a may also approach object 504b accordingly. In some embodiments, a remote user may not broadcast an avatar to other users. For example, user 508d may be remote to users 508a, 508b, and 508c, but user 508d may not project a corresponding avatar for session handle 502a.

In some embodiments, session persistence may allow users to dynamically localize to different session locations. For example, users 508a, 508b, and 508c may be in a first room, and users 508d and 508e may be in a second room, which may be down the hall from the first room. In some embodiments, user 508a may leave the first room, walk down the hall and enter the second room, and virtual content may be displayed to user 508a relative to session handle 502b. In some embodiments, each MR system used by a user may periodically poll the user's location (e.g., using GPS data and/or image recognition). In some embodiments, an MR system may trigger a new location query (e.g., by using geofencing).

Figure 6:
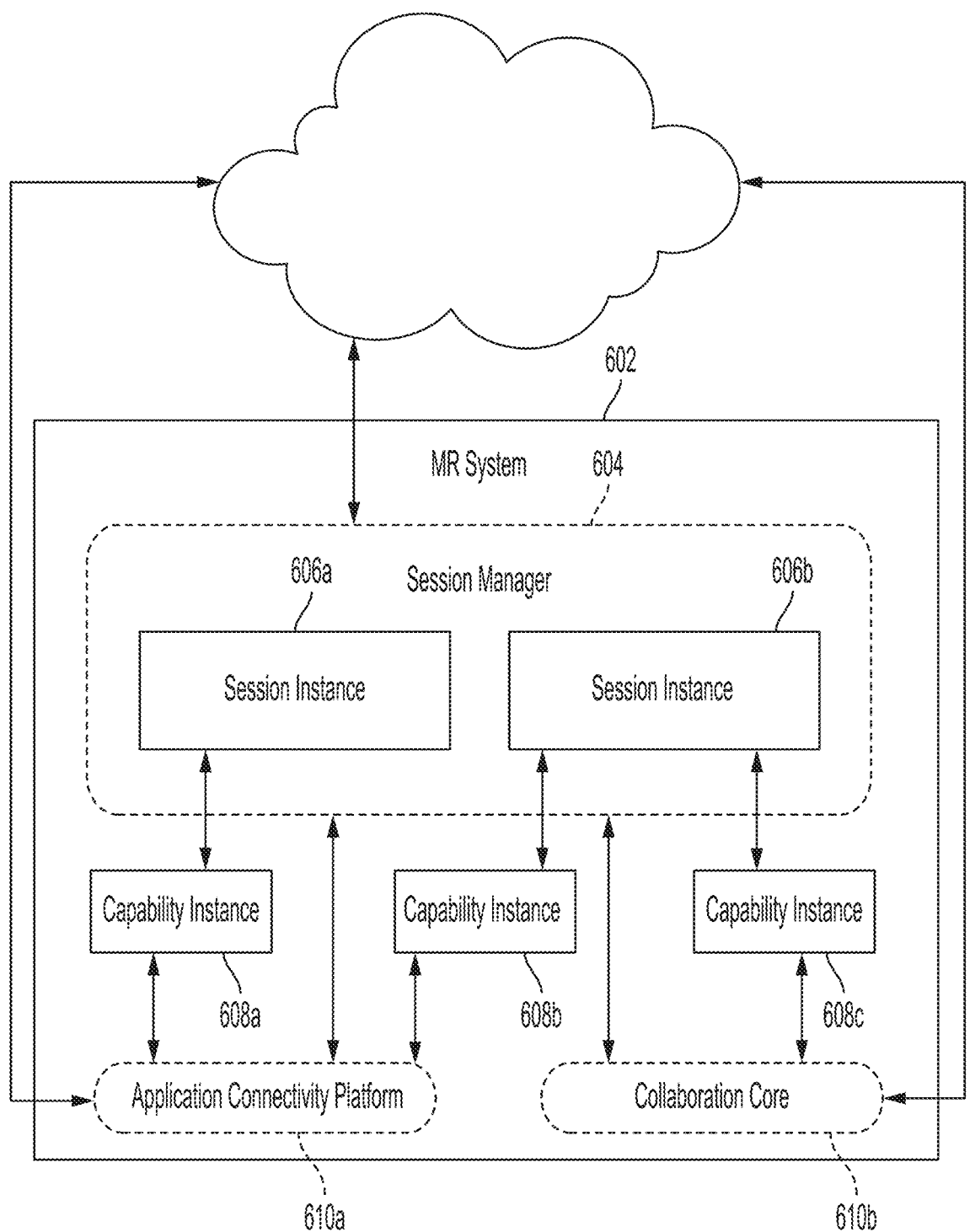
FIG. 6 illustrates an example of a session manager architecture, according to some embodiments.

FIG. 6 illustrates an exemplary session manager architecture, according to some embodiments. In some embodiments, session manager 604 may run on MR system 602, which may include one or more computer systems and can correspond to MR systems 112, 200. In some embodiments, session manager 604 can include a process, sub-process, thread, and/or service. In some embodiments, session manager 604 can include one or more data structures configured to store information. In some embodiments, session manager 604 can include a service (e.g., a background operating system service). In some embodiments, a process, sub-process, thread, and/or service of session manager 604 can be configured to continually run (e.g., in the background) while an operating system of a host system is running. In some embodiments, session manager 604 can include an instantiation of a parent background service, which may serve as a host process to one or more background processes and/or sub-processes. In some embodiments, session manager 604 can include a sub-process of a parent process. In some embodiments, session manager 604 can include a thread of a parent process.

Session manager 604 may include one or more session instances 606a and/or 606b. In some embodiments, a session instance can correspond to an MR collaboration session (e.g., session 500). In some embodiments, a session instance may manage information used in an MR collaboration session. In some embodiments, a session instance may include one or more data structures configured to store information. In some embodiments, a session instance may include one or more processes, sub-processes, threads, and/or services. In some embodiments, one or more session instances may be stored at one or more remote servers. In some embodiments, session instances may be encrypted before it is stored (locally at an MR device or at one or more remote servers).

In some embodiments, a session instance may be configured to communicate with one or more capability instances.

For example, session instance 606*b* may be configured to communicate with capability instances 608*b* and 608*c*. A capability instance may correspond to one or more session capabilities. For example, capability instance 608*b* may correspond to shared object 504*a*. In some embodiments, a capability instance may include one or more data structures configured to store information. In some embodiments, a capability instance may include one or more processes, sub-processes, threads, and/or services.

In some embodiments, a capability instance can be configured to communicate with one or more connectivity services, such as application connectivity platform 610*a* and/or collaboration core 610*b*. In some embodiments, application connectivity platform 610*a* and/or collaboration core 610*b* can include a process, sub-process, thread, and/or service. In some embodiments, application connectivity platform 610*a* and/or collaboration core 610*b* can include one or more data structures configured to store information. In some embodiments, application connectivity platform 610*a* and/or collaboration core 610*b* can include a service (e.g., a background operating system service). In some embodiments, a process, sub-process, thread, and/or service of application connectivity platform 610*a* and/or collaboration core 610*b* can be configured to continually run (e.g., in the background) while an operating system of a host system is running. In some embodiments, application connectivity platform 610*a* and/or collaboration core 610*b* can include an instantiation of a parent background service, which may serve as a host process to one or more background processes and/or sub-processes. In some embodiments, application connectivity platform 610*a* and/or collaboration core 610*b* can include a sub-process of a parent process. In some embodiments, application connectivity platform 610*a* and/or collaboration core 610*b* can include a thread of a parent process.

In some embodiments, application connectivity platform 610*a* can provide a low-latency communication pathway between MR systems in a colocation session to enable real-time virtual object colocation. In some embodiments, application connectivity platform 610*a* can include one or more implementations of Web Real-Time Communication ("WebRTC"). For example, in some embodiments, data may be transmitted via one or more Twilio tracks for low-latency communication. In some embodiments, capability instances may utilize application connectivity platform 610*a* to send and/or receive low-latency data (e.g., relational transform data as a shared virtual object moves) from MR systems in a session. In some embodiments, application connectivity platform 610*a* can be configured to communicate with other application connectivity platforms running on other MR systems.

In some embodiments, collaboration core 610*b* can provide data synchronization services for simultaneous edits. In some embodiments, collaboration core 610*b* can be configured to receive edit data from one or more capability instances. In some embodiments, collaboration core 610*b* can be configured to communicate with external synchronization services (e.g., Firebase) to synchronize simultaneous edits to virtual content in a session.

In some embodiments, application connectivity platform 610*a* and/or collaboration core 610*b* may communicate with session manager 604. In some embodiments, session manager 604 may provide privileged information directly to application connectivity platform 610*a* and/or collaboration core 610*b* (e.g., user identification data). It can be beneficial to shield privileged information from capability instances because a capability instance may be developed by an unknown developer, which may pose a security risk to the privileged data.

Although application connectivity platform 610*a* and collaboration core 610*b* are depicted as separate services, it is also contemplated that functions provided by each could be provided as a single service or as two or more services.

In some embodiments, session manager 604 may communicate with one or more remote servers and/or with one or more MR systems to synchronize session instances. For example, a second MR system may initiate a session and invite MR system 602 to participate in the session. In some embodiments, session manager 604 may create a new session instance corresponding to the newly joined session. In some embodiments, the new session instance may be a copy of a session instance on the second MR system. In some embodiments, a session instance may be received from one or more remote servers. In some embodiments, session instance data may be transmitted to one or more remote servers (e.g., if a capability instance has been updated, it can be desirable to transmit the update to other session users). In some embodiments, session instance data can be transmitted to one or more remote servers at an end of a session (e.g., when the last user leaves a session), so that session data may be preserved and re-accessed at a later time. In some embodiments, session manager and/or a session instance may communicate with one or more services (e.g., one or more services provided by application connectivity platform 610*a*) to synchronize session instance data with other session instances (that may be stored at another MR system or a remote server). In some embodiments, session manager and/or a session instance may communicate with one or more services to establish a real-time and/or low-latency communication link with one or more remote end points (e.g., other MR systems in a session).

Figure 7:
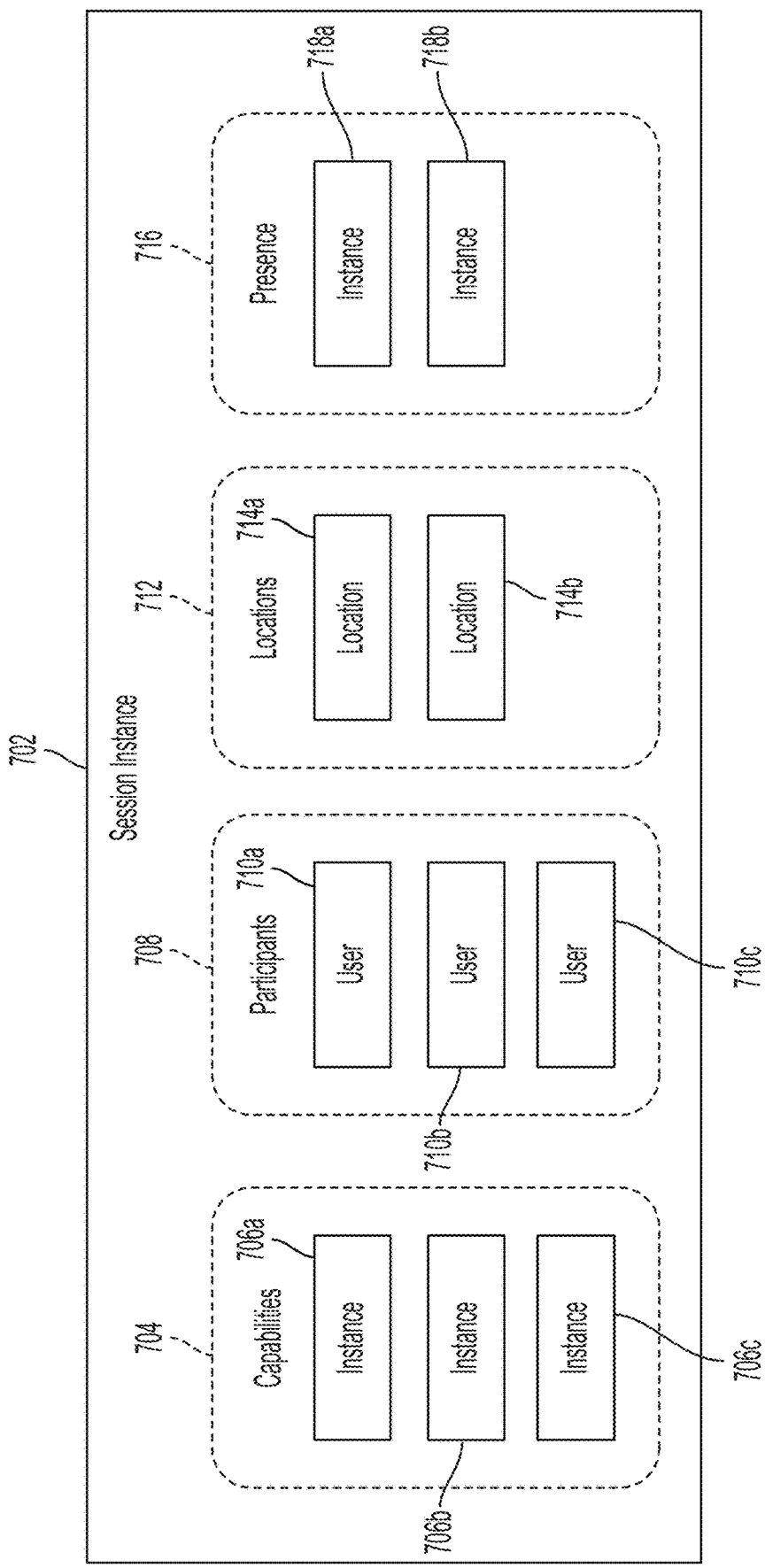
FIG. 7 illustrates an example of a session instance, according to some embodiments.

FIG. 7 illustrates an exemplary session instance architecture, according to some embodiments. In some embodiments, session instance 702 may correspond to session instance 604*a* and/or 604*b*. In some embodiments, session instance 702 can include one or more data structures, which can be configured to store one or more additional data structures (e.g., capabilities module 704, participants module 708, locations module 712, and/or presence module 716). Capabilities module 704 may manage data and/or data structures corresponding to one or more capability instances in a session. For example, instance 706*a* may correspond to a virtual object. In some embodiments, instance 706*a* may include transform data, which may relate the virtual object's position to persistent coordinate data and/or one or more session handle locations. In some embodiments, instance 706*a* may include one or more references to a collaboration core service. In some embodiments, references to a collaboration core service may enable instance 706*a* to be properly notified and/or updated if a change is made to instance 706*a* by a user. In some embodiments, instance 706*a* may include application connectivity platform data (e.g., where data should be sent to, what pipes should be used, etc.). In some embodiments, capabilities module 704 may be configured to communicate with one or more capability instances (e.g., capability instance 608*a*).

In some embodiments, session instance 702 may include participants module 708. Participants module 708 may manage data and/or data structures corresponding to one or more users in a session. For example, user 710*a* may include an identifier for an MR system used by a user. In some embodiments, user 710*a* may include avatar data (e.g., appearance, size, color, etc.). In some embodiments, user 710*a* may include location data. In some embodiments, location data can include GPS data, WiFi data, cellular data, persistent coordinate data, etc.

In some embodiments, session instance 702 may include locations module 712. Locations module 712 may manage data and/or data structures corresponding to one or more locations in a session. For example, location 714*a* may include persistent coordinate data, transformation data, data corresponding to a floor plane, etc. In some embodiments, location 714*a* may correspond to a user location. In some embodiments, location 714*a* may correspond to a session handle location.

In some embodiments, session instance 702 may include presence module 716. Presence module 716 may manage data and/or data structures corresponding to local and/or remote status of one or more users. For example, instance 718*a* may indicate that a first user is remote from a second user, and a third user is local to the second user. In some embodiments, instance 718*a* may include data used for communication between users (e.g., using application connectivity platform 610*a*).

Systems, methods, and computer-readable media are disclosed. According to some examples, a system comprises: a wearable device comprising a transmissive display; and one or more processors configured to execute a method comprising: receiving persistent coordinate data; presenting a first virtual session handle to a first user at a first position via the transmissive display of a wearable device, wherein the first position is determined based on the persistent coordinate data; presenting a virtual object to the first user at a second position via the transmissive display, wherein the second position is determined based on the first position; receiving location data from a second user, wherein the location data relates a position of the second user to a position of a second virtual session handle; and presenting a virtual avatar to the first user at a third position via the transmissive display, wherein the virtual avatar corresponds to the second user, wherein the third position is determined based on the location data, and wherein the third position is further determined based on the first position. In some examples, the method further comprises: receiving an input from the second user; and in response to receiving the input from the second user, presenting the virtual object to the first user at a fourth position via the transmissive display. In some examples, the virtual object is presented to the first user at the second position in response to an input from the first user, and the method further comprises transmitting the input from the first user to the second user. In some examples, the method further comprises: receiving an input from the first user; in response to receiving the input from the first user, presenting the first session handle to the first user at a fourth position; and presenting the virtual object to the first user at a fifth position via the transmissive display, the fifth position determined based on the fourth position. In some examples, the method further comprises transmitting the input from the first user to the second user. In some examples, the method further comprises: storing in a memory the first position, the second position, and the third position associated with a session instance at a first time; and receiving from the memory the first position, the second position, and the third position at a second time later than the first time.

According to some examples, a method comprises: receiving persistent coordinate data; presenting a first virtual session handle to a first user at a first position via a transmissive display of a wearable device, wherein the first position is determined based on the persistent coordinate data; presenting a virtual object to the first user at a second position via the transmissive display, wherein the second position is determined based on the first position; receiving location data from a second user, wherein the location data relates a position of the second user to a position of a second virtual session handle; and presenting a virtual avatar to the first user at a third position via the transmissive display, wherein the virtual avatar corresponds to the second user, wherein the third position is determined based on the location data, and wherein the third position is further determined based on the first position. In some examples, the method further comprises: receiving an input from the second user; and in response to receiving the input from the second user, presenting the virtual object to the first user at a fourth position via the transmissive display. In some examples, the virtual object is presented to the first user at the second position in response to an input from the first user, and the method further comprises transmitting the input from the first user to the second user. In some examples, the method further comprises: receiving an input from the first user; in response to receiving the input from the first user, presenting the first session handle to the first user at a fourth position; and presenting the virtual object to the first user at a fifth position via the transmissive display, the fifth position determined based on the fourth position. In some examples, the method further comprises transmitting the input from the first user to the second user. In some examples, the method further comprises: storing in a memory the first position, the second position, and the third position associated with a session instance at a first time; and receiving from the memory the first position, the second position, and the third position at a second time later than the first time.

According to some examples, a non-transitory computer-readable medium stores instructions that, when executed by one or more processors, cause the one or more processors to execute a method comprising: receiving persistent coordinate data; presenting a first virtual session handle to a first user at a first position via a transmissive display of a wearable device, wherein the first position is determined based on the persistent coordinate data; presenting a virtual object to the first user at a second position via the transmissive display, wherein the second position is determined based on the first position; receiving location data from a second user, wherein the location data relates a position of the second user to a position of a second virtual session handle; and presenting a virtual avatar to the first user at a third position via the transmissive display, wherein the virtual avatar corresponds to the second user, wherein the third position is determined based on the location data, and wherein the third position is further determined based on the first position. In some examples, the method further comprises: receiving an input from the second user; and in response to receiving the input from the second user, presenting the virtual object to the first user at a fourth position via the transmissive display. In some examples, the virtual object is presented to the first user at the second position in response to an input from the first user, and the method further comprises transmitting the input from the first user to the second user. In some examples, the method further comprises: receiving an input from the first user; in response to receiving the input from the first user, presenting the first session handle to the first user at a fourth position; and presenting the virtual object to the first user at a fifth position via the transmissive display, the fifth position determined based on the fourth position. In some examples, the method further comprises transmitting the input from the first user to the second user. In some examples, the method further comprises: storing in a memory the first position, the second position, and the third position associated with a session instance at a first time; and receiving from the memory the first position, the second position, and the third position at a second time later than the first time.

According to some examples, a system comprises: a first wearable device comprising a first transmissive display and one or more sensors; and one or more processors configured to execute a method comprising: receiving a first input from a first session user associated with the first wearable device; in response to receiving the first input, generating a session instance, wherein the session instance is configured to store data corresponding to one or more capability instances, and wherein the session instance is further configured to store data corresponding to one or more session users; presenting a virtual session handle to the first session user at a first session handle position via the first transmissive display of the first wearable device; receiving a second input from the first session user; and in response to receiving the second input: generating a first capability instance associated with a process, the process comprising projecting a virtual object; presenting the virtual object to the first session user at a first object position via the first transmissive display; presenting the virtual object to a second session user at a second object position via a second transmissive display of a second wearable device; and storing data corresponding to the first session handle position, the first object position, the second object position, a first session user position, and a second session user position in the session instance, wherein the first session user position is determined via the one or more sensors of the first wearable device and the second session user position is determined via one or more sensors of the second wearable device. In some examples, the first object position is related to the first session handle position using transform data. In some examples, the transform data is stored in the session instance. In some examples, the method further comprises storing data corresponding to a localization status, wherein the localization status is based on the first session user position and the second session user position. In some examples, the second input is received at a first time, and the method further comprises: receiving a third input from the first session user at a second time later than the first time; and in response to receiving the third input: receiving data corresponding to the first object position and the first session user position; and presenting the virtual object to the first session user at the first object position. In some examples, the method further comprises: generating a second capability instance, the second capability instance associated with a second process, the second process comprising projecting a virtual avatar of the second session user; presenting the virtual avatar to the first session user via the first transmissive display; and storing data corresponding to the virtual avatar in the session instance. In some examples, the method further comprises generating a second capability instance, the second capability instance associated with a second process, the second process comprising casting a view associated with the first session user to the second session user.

According to some examples, a method comprises: receiving a first input from a first session user; in response to receiving the first input, generating a session instance, wherein the session instance is configured to store data corresponding to one or more capability instances, and wherein the session instance is further configured to store data corresponding to one or more session users; presenting a virtual session handle to the first session user at a first session handle position via a first transmissive display of a first wearable device; receiving a second input from the first session user; and in response to receiving the second input: generating a first capability instance associated with a process, the process comprising projecting a virtual object; presenting the virtual object to the first session user at a first object position via the first transmissive display; presenting the virtual object to a second session user at a second object position via a second transmissive display of a second wearable device; and storing data corresponding to the first session handle position, the first object position, the second object position, a first session user position, and a second session user position in the session instance, wherein the first session user position is determined via one or more sensors of the first wearable device and the second session user position is determined via one or more sensors of the second wearable device. In some examples, the first object position is related to the first session handle position using transform data. In some examples, the transform data is stored in the session instance. In some examples, the method further comprises storing data corresponding to a localization status, wherein the localization status is based on the first session user position and the second session user position. In some examples, the second input is received at a first time, and the method further comprises: receiving a third input from the first session user at a second time later than the first time; and in response to receiving the third input: receiving data corresponding to the first object position and the first session user position; and presenting the virtual object to the first session user at the first object position. In some examples, the method further comprises: generating a second capability instance, the second capability instance associated with a second process, the second process comprising projecting a virtual avatar of the second session user; presenting the virtual avatar to the first session user via the first transmissive display; and storing data corresponding to the virtual avatar in the session instance. In some examples, the method further comprises generating a second capability instance, the second capability instance associated with a second process, the second process comprising casting a view associated with the first session user to the second session user.

According to some examples, a non-transitory computer-readable medium stores instructions that, when executed by one or more processors, cause the one or more processors to execute a method comprising: receiving a first input from a first session user; in response to receiving the first input, generating a session instance, wherein the session instance is configured to store data corresponding to one or more capability instances, and wherein the session instance is further configured to store data corresponding to one or more session users; presenting a virtual session handle to the first session user at a first session handle position via a first transmissive display of a first wearable device; receiving a second input from the first session user; in response to receiving the second input: generating a first capability instance associated with a process, the process comprising projecting a virtual object; presenting the virtual object to the first session user at a first object position via the first transmissive display; presenting the virtual object to a second session user at a second object position via a second transmissive display of a second wearable device; and storing data corresponding to the first session handle position, the first object position, the second object position, a first session user position, and a second session user position in the session instance, wherein the first session user position is determined via one or more sensors of the first wearable device and the second session user position is determined via one or more sensors of the second wearable device. In some examples, the first object position is related to the first session handle position using transform data. In some examples, the transform data is stored in the session instance. In some examples, the method further comprises storing data corresponding to a localization status, wherein the localization status is based on the first session user position and the second session user position. In some examples, the second input is received at a first time, and the method further comprises: receiving a third input from the first session user at a second time later than the first time; and in response to receiving the third input: receiving data corresponding to the first object position and the first session user position; and presenting the virtual object to the first session user at the first object position. In some examples, the method further comprises: generating a second capability instance, the second capability instance associated with a second process, the second process comprising projecting a virtual avatar of the second session user; presenting the virtual avatar to the first session user via the first transmissive display; and storing data corresponding to the virtual avatar in the session instance. In some examples, the method further comprises generating a second capability instance, the second capability instance associated with a second process, the second process comprising casting a view associated with the first session user to the second session user.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
 a wearable device comprising a transmissive display; and
 one or more processors configured to execute a method comprising:
  receiving persistent coordinate data;
  presenting, to a first user at a first position via the transmissive display of the wearable device, a first virtual session handle of a session, wherein the first position is determined based on the persistent coordinate data;
  presenting a virtual object to the first user at a second position via the transmissive display, wherein the second position is determined based on the first position; and
  receiving location data from a second user, wherein the location data relates a position of the second user to a position of a second virtual session handle of the session;
 wherein:
  the session comprises data associated with the first user and further comprises data associated with the second user, and
  the wearable device is configured to communicate with a session manager associated with the session.

2. The system of claim 1, the method further comprising:
 receiving an input from the second user; and
 in response to receiving the input from the second user, presenting the virtual object to the first user at a third position via the transmissive display.

3. The system of claim 1, wherein the virtual object is presented to the first user at the second position in response to an input from the first user, the method further comprising transmitting the input from the first user to the second user.

4. The system of claim 1, the method further comprising:
 receiving an input from the first user;
 in response to receiving the input from the first user, presenting the first session handle to the first user at a third position; and
 presenting the virtual object to the first user at a fourth position via the transmissive display, the fourth position determined based on the third position.

5. The system of claim 4, the method further comprising transmitting the input from the first user to the second user.

6. The system of claim 1, the method further comprising:
 storing, in a memory, the first position and the second position associated with a session instance at a first time; and
 retrieving, from the memory, the first position and the second position at a second time later than the first time.

7. The system of claim 1, wherein the virtual object is associated with a capability of the session.

8. A method comprising:
 receiving persistent coordinate data;
 presenting, to a first user at a first position via a transmissive display of a wearable device, a first virtual session handle of a session, wherein the first position is determined based on the persistent coordinate data;
 presenting a virtual object to the first user at a second position via the transmissive display, wherein the second position is determined based on the first position; and
 receiving location data from a second user, wherein the location data relates a position of the second user to a position of a second virtual session handle of the session;
 wherein:
  the session comprises data associated with the first user and further comprises data associated with the second user, and
  the wearable device is configured to communicate with a session manager associated with the session.

9. The method of claim 8, further comprising:
 receiving an input from the second user; and
 in response to receiving the input from the second user, presenting the virtual object to the first user at a third position via the transmissive display.

10. The method of claim 8, wherein the virtual object is presented to the first user at the second position in response to an input from the first user, the method further comprising transmitting the input from the first user to the second user.

11. The method of claim 8, further comprising:
 receiving an input from the first user;
 in response to receiving the input from the first user, presenting the first session handle to the first user at a third position; and
 presenting the virtual object to the first user at a fourth position via the transmissive display, the fourth position determined based on the third position.

12. The method of claim 11, further comprising transmitting the input from the first user to the second user.

13. The method of claim 8, further comprising:
 storing, in a memory, the first position and the second position associated with a session instance at a first time; and retrieving, from the memory, the first position and the second position at a second time later than the first time.

14. The method of claim 8, wherein the virtual object is associated with a capability of the session.

15. A non-transitory computer-readable medium storing instructions that, when executed by one or more processors, cause the one or more processors to execute a method comprising:
receiving persistent coordinate data;
presenting, to a first user at a first position via a transmissive display of a wearable device, a first virtual session handle of a session, wherein the first position is determined based on the persistent coordinate data;
presenting a virtual object to the first user at a second position via the transmissive display, wherein the second position is determined based on the first position; and
receiving location data from a second user, wherein the location data relates a position of the second user to a position of a second virtual session handle of the session,
wherein:
the session comprises data associated with the first user and further comprises data associated with the second user, and
the wearable device is configured to communicate with a session manager associated with the session.

16. The non-transitory computer-readable medium of claim 15, the method further comprising:
receiving an input from the second user; and
in response to receiving the input from the second user, presenting the virtual object to the first user at a third position via the transmissive display.

17. The non-transitory computer-readable medium of claim 15, wherein the virtual object is presented to the first user at the second position in response to an input from the first user, the method further comprising transmitting the input from the first user to the second user.

18. The non-transitory computer-readable medium of claim 15, the method further comprising:
receiving an input from the first user;
in response to receiving the input from the first user, presenting the first session handle to the first user at a third position; and
presenting the virtual object to the first user at a fourth position via the transmissive display, the fourth position determined based on the third position.

19. The non-transitory computer-readable medium of claim 18, the method further comprising transmitting the input from the first user to the second user.

20. The non-transitory computer-readable medium of claim 15, the method further comprising:
storing, in a memory, the first position and the second position associated with a session instance at a first time; and
retrieving, from the memory, the first position and the second position at a second time later than the first time.

* * * * *